United States Patent
Stark et al.

(10) Patent No.: US 6,863,985 B2
(45) Date of Patent: Mar. 8, 2005

(54) HYDROPHOBICIZED COPOLYMERS

(75) Inventors: Kurt Stark, Burgkirchen (DE); Harald Zeh, Burghausen (DE); Klaus Bueppelmann, Emmerting (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 0 days.

(21) Appl. No.: 10/271,881

(22) Filed: Oct. 16, 2002

(65) Prior Publication Data

US 2003/0114583 A1 Jun. 19, 2003

(30) Foreign Application Priority Data

Oct. 31, 2001 (DE) .......................................... 101 53 734

(51) Int. Cl.$^7$ .............................. B32B 9/04; C08F 30/08
(52) U.S. Cl. ....................... 428/447; 524/424; 524/806; 524/837; 424/100; 424/101; 424/103; 424/104; 424/105; 526/279; 528/25; 528/26; 528/30; 528/32
(58) Field of Search ................................ 528/806, 837, 528/25, 26, 32, 30; 525/100, 101, 103, 104, 105, 102; 524/424, 837, 806; 526/279

(56) References Cited

U.S. PATENT DOCUMENTS

| | | | | |
|---|---|---|---|---|
| 4,564,557 A | * | 1/1986 | Ohgushi et al. ............ | 428/333 |
| 5,214,095 A | * | 5/1993 | Lavoie ........................ | 524/806 |
| 5,576,384 A | | 11/1996 | Nölken | |
| 6,100,332 A | * | 8/2000 | Yoshikawa et al. ......... | 525/101 |

FOREIGN PATENT DOCUMENTS

| | | | |
|---|---|---|---|
| DE | 2148457 | 4/1973 | |
| EP | 0 122 457 A2 | 10/1984 | |
| EP | 159894 | 10/1985 | |
| EP | 327006 | 8/1989 | |
| EP | 327376 | 8/1989 | |
| EP | 352339 | 1/1990 | |
| EP | 352339 A1 * | 1/1990 | ......... C08F/230/08 |
| EP | 771826 | 5/1997 | |
| EP | 1095953 | 5/2001 | |
| EP | 1153979 | 11/2001 | |
| GB | 1407827 | 9/1975 | |
| WO | WO 95/20626 | 8/1995 | |

OTHER PUBLICATIONS

Derwent Abstract corresponding to WO 95/20626 [AN 1995–269862].
Derwent Abstract corresponding to EP 1153979 [AN 2002–099044].
Chemical Abstract 1990, vol. 112, No. 20.
Fortschrittsbericht 1960, Ref. 5119/60 and English Translation.
Hochmolekularbericht 1965, Ref. 1720/65 and Caplus Abstract.
Derwent Abstract AN 94–238821/29.
Chemical Abstract 1986, vol. 104, No. 104:90610s.
Derwent Abstract AN 96–395026/40.

* cited by examiner

Primary Examiner—Margaret G. Moore
Assistant Examiner—Marc S Zimmer
(74) Attorney, Agent, or Firm—Brooks Kushman P.C.

(57) ABSTRACT

Functionalized copolymers hydrophobicized with silicones, in the form of aqueous dispersions or water-redispersible powders are prepared by copolymerizing a) from 60 to 99.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides, b) from 0.01 to 30% by weight of one or more silicones with from 10 to 1,000 $SiO(C_nH_{2n+1})_2$ repeat units where n is from 1 to 6, and where from 90 to 100% by weight of the silicones b) contain at least one but not more than two polymerizable groups, c) from 0.05 to 5.0% by weight of one or more hydrolyzable silane monomers selected from the group consisting of ethylenically unsaturated hydrolyzable silicon compounds, and hydrolyzable epoxysilanes, aminosilanes and mercaptosilanes, and d) from 0.05 to 5.0% by weight of one or more monomers selected from the group consisting of ethylenically unsaturated epoxy compounds.

The copolymers may be used as binders for paints and coatings with high wet abrasion resistance.

17 Claims, No Drawings

HYDROPHOBICIZED COPOLYMERS

BACKGROUND OF THE INVENTION

1. Field of the Invention

The invention relates to hydrophobicized copolymers in the form of aqueous dispersions or water-redispersible powders, to a process for their preparation, and to their use.

2. Background Art

It is known from the prior art that the addition of hydrolyzable vinylsilanes during the preparation of polymer dispersions can achieve improvements in properties when such polymer dispersions are used as binders for paints. For example, DE-C 2148457 (GB-A 1407827) describes the use of aqueous dispersions which comprise polymers having copolymerized silanol groups to improve wet-adhesion of coating compositions used in construction work to a very wide variety of substrates. EP-A 327376 describes vinyl ester-based polymer dispersions which contain a small proportion of ethylenically unsaturated alkoxysilane monomers. The polymer dispersions are recommended for the production of paints with good wet-abrasion. EP-A 327006 (U.S. Pat. No. 5,576,384) discloses low-VOC ("volatile organic compounds") emulsion paints and renders which include copolymers having hydrolyzable silane units as binders.

WO-A 95/20626 discloses the modification of water-redispersible polymer powders by addition of non-copolymerizable organosilicon compounds.

A disadvantage of these silane-modified polymer dispersions is that when used in the form of paint they do not bring about improvement in wet adhesion generally, but instead produce quite dissimilar effects in different paint formulations. EP-A 1153979 improves upon this variability by modifying the polymers with a combination of copolymerizable silanes and ethylenically unsaturated epoxides.

EP-A 0352339 describes protective paints for concrete structures comprising copolymers of divinylpolydimethylsiloxane with acrylic or methacrylic esters and with vinyl- and acrylic-functional alkoxysilanes, in the form of a solution in organic solvents. EP-A 159894 relates to hot-curing acrylic resin solutions in organic solvents which are used for metal coating, in particular for stainless steel. To improve metal adhesion, in particular to inhibit flake-off of the coating during deformation of the coated metal parts, use is made of acrylic resin solutions of copolymers of (meth)acrylates, hydroxy- or epoxy-functional (meth)acrylates, vinyl-functional polysiloxanes, and vinyl-functional silanes. To improve adhesion, the polymers are post-crosslinked and heat-cured, using organic tin compounds as crosslinking catalysts. A disadvantage of the solvent-containing and hot-curing coating compositions is that the solvent content and thermal crosslinking prevents their use as binders for polymer renders or in internal or external paints for the painting of buildings.

EP-B 771826 describes aqueous binders for coatings and adhesives based on emulsion polymers of vinyl esters, acrylic or methacrylic esters, or vinylaromatics, which comprise, as crosslinkers, polysiloxanes having unsaturated radicals such as vinyl, or acryloxy or methacryloxy groups. The organic monomer is emulsion polymerized, and the silicone is added at a particular juncture during the reaction. Additives which may be added subsequently include low-molecular-weight, polymerizable or non-polymerizable silanes, which permit further subsequent crosslinking of the polymer with organotin compounds. EP-A 943634 describes aqueous latices for use as coating compositions, which are prepared by copolymerizing ethylenically unsaturated monomers in the presence of a silicone resin containing silanol groups. Interpenetrating networks (IPNs) form from the polymer chains and polysiloxane chains. EP-A 1095953 describes silicone-grafted vinyl copolymers where a carbosiloxane dendrimer has been grafted onto the vinyl polymer.

Although the last-mentioned emulsion polymers are suitable for outdoor applications, their wet-abrasion resistance remains unsatisfactory. Another disadvantage of the silicone-modified emulsion polymers described in the prior art is a marked susceptibility toward hydrolysis and toward uncontrolled crosslinking. In many applications, crosslinking is desirable and is indeed reinforced by subsequent addition of silane and catalyst, but in paint dispersions or in coating-compositions, such crosslinking is the cause of undesirable gelling, "specks" and insolubles content. In addition, the silicone-containing emulsion polymers known hitherto are often not alkali-resistant, since silicones are known to be unstable under alkaline conditions. As a result, in the systems previously described, hydrophobic properties and other useful properties associated therewith fall away very sharply after a period of time. Finally, the introduction of large amounts of silanes or silicones results in unsatisfactory particle size distribution in the emulsion polymers, i.e. the particles become too large and the polymer becomes inhomogeneous, which may result in supernatant formation or phase separation.

SUMMARY OF THE INVENTION

It is an object of the invention, therefore, to develop polymers which firstly provide coating compositions, for example paints, with very good wet-abrasion resistance, and secondly are hydrophobic and resistant to hydrolysis, and therefore weathering-resistant, water-repellent, and non-soiling, while providing good permeability to water vapor, so that they can also be used successfully for outdoor applications, for example in the construction sector.

DETAILED DESCRIPTION OF THE PREFERRED EMBODIMENTS

The invention provides functionalized copolymers which have been hydrophobicized with silicones and are in the form of an aqueous dispersion or water-redispersible powder, these copolymers based on a) from 60 to 99.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides, b) from 0.01 to 30% by weight of one or more silicones with from 10 to 1,000 $SiO(C_nH_{2n+1})_2$ repeat units where n is from 1 to 6, and where from 90 to 100% by weight of the silicones b) contain at least one, but not more than two, addition polymerizable groups, c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes, and d) from 0.05 to 5.0% by weight of one or more monomers selected from the group consisting of ethylenically unsaturated epoxy compounds, wherein the weight percentages for components a) to d) are based on the total weight of all monomers used, and total 100%.

Suitable vinyl esters include vinyl esters of unbranched or branched ("optionally branched") carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 5 to 11 carbon atoms, for example VeoVa9® or VeoVa10® (trade names of Shell). Particular preference is given to vinyl acetate, and the greatest preference is given to a combination of vinyl acetate with α-branched monocarboxylic acids having from 5 to 11 carbon atoms, for example VeoVa10®.

Suitable acrylic acid or methacrylic acid ester monomers include esters of optionally branched alcohols having from 1 to 15 carbon atoms. Preferred methacrylates or acrylates are methyl acrylate, methyl methacrylate, ethyl acrylate, ethyl methacrylate, propyl acrylate, propyl methacrylate, n-butyl acrylate, isobutyl acrylate, tert-butyl acrylate, n-butyl methacrylate, isobutyl methacrylate, tert-butyl methacrylate, 2-ethylhexyl acrylate, norbornyl acrylate. Particular preference is given to methyl acrylate, methyl methacrylate, n-butyl acrylate, isobutyl acrylate, tert-butyl acrylate, 2-ethylhexyl acrylate, and norbornyl acrylate.

Suitable dienes include 1,3-butadiene and isoprene. Examples of copolymerizable olefins are ethene and propene. Vinylaromatics which may be copolymerized are styrene and vinyltoluene. The vinyl halides usually used are vinyl chloride, vinylidene chloride, or vinyl fluoride, preferably vinyl chloride.

Where appropriate, use may also be made of from 0.05 to 10% by weight of auxiliary monomers based on the total weight of the copolymer. Examples of auxiliary monomers are ethylenically unsaturated mono- and dicarboxylic acids, preferably acrylic acid, methacrylic acid, fumaric acid, and maleic acid; ethylenically unsaturated carboxamides and ethylenically unsaturated carbonitriles, preferably acrylamide and acrylonitrile; mono- and diesters of fumaric acid or maleic acid, for example their diethyl or diisopropyl esters; maleic anhydride; ethylenically unsaturated sulfonic acids and their salts, preferably vinylsulfonic acid and 2-acrylamido-2-methylpropanesulfonic acid. Other examples are precrosslinking comonomers such as ethylenically polyunsaturated comonomers, e.g., divinyl adipate, diallyl maleate, allyl methacrylate, butanediol diacrylate, or triallyl cyanurate, or post-crosslinking comonomers such as acrylamidoglycolic acid (AGA), methyl methylacrylamidoglycolate (MAGME), N-methylolacrylamide (NMA), N-methylolmethacrylamide, allyl N-methylolcarbamate; alkyl esters or ethers, such as the isobutoxy ether, of N-methylolacrylamide, of N-methylolmethacrylamide, or of allyl N-methylolcarbamate.

Preference is given to the following copolymer compositions which additionally include comonomers b), c), and d), and also may optionally include auxiliary monomers in the amounts previously stated: vinyl ester copolymers of vinyl acetate with other vinyl esters such as vinyl laurate, vinyl pivalate, vinyl 2-ethylhexanoate, and vinyl esters of alpha-branched carboxylic acids, in particular vinyl esters of versatic acids, i.e. VeoVa9®, VeoVa10®; vinyl ester-ethylene copolymers such as vinyl acetate-ethylene copolymers, which may also contain other vinyl esters such as vinyl laurate, vinyl pivalate, vinyl 2-ethylhexanoate, vinyl esters of alpha-branched carboxylic acids, in particular vinyl versatates such as VeoVa9®, VeoVa10®, or fumaric or maleic diesters; vinyl ester-ethylene-vinyl chloride copolymers, where preferred vinyl esters are vinyl acetate and/or vinyl propionate and/or one or more copolymerizable vinyl esters such as vinyl laurate, vinyl pivalate, vinyl 2-ethylhexanoate, vinyl esters of an alpha-branched carboxylic acid, in particular vinyl versatate (VeoVa9®, VeoVa10®); vinyl ester-acrylic ester copolymers with vinyl acetate and/or vinyl laurate and/or vinyl versatate and with acrylic esters, in particular butyl acrylate or 2-ethylhexyl acrylate, where these also optionally contain ethylene; acrylic ester copolymers with n-butyl acrylate and/or 2-ethylhexyl acrylate; methyl methacrylate copolymers with butyl acrylate and/or 2-ethylhexyl acrylate and/or 1,3-butadiene; styrene-1,3-butadiene copolymers and styrene-(meth)acrylic ester copolymers such as styrene-butyl acrylate, styrene-methyl methacrylate-butyl acrylate, or styrene-2-ethylhexyl acrylate, where the butyl acrylate used may comprise n-butyl acrylate, isobutyl acrylate, or tert-butyl acrylate.

The greatest preference is given to vinyl ester-ethylene copolymers such as vinyl acetate-ethylene copolymers, and in particular copolymers of vinyl acetate and ethylene with vinyl esters of an α-branched carboxylic acid having 9 or 10 carbon atoms (VeoVa9®, VeoVa10®), having an ethylene content which is preferably from 2 to 30% by weight, and which, where appropriate, may also contain the stated amounts of auxiliary monomers.

Suitable silicones b) are linear or branched polydialkylsiloxanes having a $C_1$–$C_6$-alkyl radical and having a chain length of from 10 to 1,000, preferably from 50 to 500, $SiO(C_nH_{2n+1})_2$ units. It is preferable that from 90 to 99.5% by weight, and more preferable that from 95 to 99.5% by weight, of the polydialkylsiloxanes of the silicone content b) contain one or two polymerizable terminal groups (functional groups). Examples of these are polydialkylsiloxanes having one or two vinyl, acryloxyalkyl, methacryloxyalkyl, or mercaptoalkyl groups which contain from 1 to 6 carbon atoms and may be identical or different. Preference is given to α,ω-divinylpolydimethylsiloxanes, α,ω-di(3-acryloxypropyl)polydimethylsiloxanes, α,ω-di(3-methacryloxypropyl)polydimethylsiloxanes, α-monovinylpolydimethylsiloxanes, α-mono(3-acryloxypropyl)polydimethylsiloxanes, α-mono(3-methacryloxypropyl)polydimethylsiloxanes, and silicones with chain-transfering groups such as α-mono(3-mercaptopropyl)polydimethylsiloxanes, or α,ω-di(3-mercaptopropyl)polydimethylsiloxanes.

Particular preference is given to mixtures of non-functionalized, linear or branched polydialkylsiloxanes, in particular polydimethylsiloxanes, with linear or branched polydialkylsiloxanes, preferably polydimethylsiloxanes, which contain one and/or two of the abovementioned groups, preferably vinyl groups, at the chain end(s). Examples of mixtures of this type are binary mixtures of monofunctional with non-functional polydialkylsiloxanes, or of bifunctional and non-functional polydialkylsiloxanes, the proportion of non-functional polydialkylsiloxanes being from 1 to 50% by weight based on the total weight of silicone component b), and binary mixtures of monofunctional with bifunctional polydialkylsiloxanes. Preference is given to tertiary mixtures of non-functional polydialkylsiloxanes b1), monofunctional polydialkylsiloxanes b2), and bifunctional polydialkylsiloxanes b3), the proportions by weight most preferably being from 1 to 10% by weight of b1), from 5 to 50% by weight of b2), and from 40 to 90% by weight of b3), based on the total weight of silicone component b). These polydialkylsiloxanes and mixtures thereof, are commercially available, an example being Dehesive® Silicones from Wacker-Chemie GmbH.

The selection of components a) and b) is preferably such as to give aqueous copolymer dispersions and aqueous redispersions of the copolymer powders with a minimum film-forming temperature MFT of <10° C., preferably <5° C., most preferably from 0 to 2° C., without addition of any film-forming aid. The skilled worker knows from the glass transition temperature Tg which monomers or monomer mixtures can be used for this purpose. The glass transition temperature Tg of the polymers may be determined in a known manner by differential scanning calorimetry (DSC). The Tg may also be predicted approximately by means of the "Fox equation," according to T. G. Fox, *Bull. Am. Physics Soc.* 1, 3, page 123 (1956): $1/Tg = x_1/Tg_1 + x_2/Tg_2 + \ldots + x_n/Tg_n$, where $x_n$ is the mass fraction (% by weight/100) of monomer n and $Tg_n$ is the glass transition temperature in kelvin of the homopolymer of monomer n. Tg values for homopolymers are listed in the Polymer Handbook 2nd edition, J. Wiley & Sons, New York (1975).

Suitable hydrolyzable silicon compounds c) are ethylenically unsaturated and therefore copolymerizable silicon compounds of the general formula $R^1SiR_{0-2}(OR^2)_{1-3}$, where R is a $C_1$–$C_3$-alkyl radical, a $C_1$–$C_3$-alkoxy radical, or halogen (e.g. Cl or Br), $R^1$ is $CH_2=CR^3-(CH_2)_{0-1}$ or $CH_2=CR^3CO_2(CH_2)_{1-3}$, and $R^2$ is an optionally branched, optionally substituted alkyl radical having from 1 to 12 carbon atoms, preferably from 1 to 3 carbon atoms, or is an acyl radical having from 2 to 12 carbon atoms, and $R^2$ may be interrupted by an ether linkage, and $R^3$ is H or $CH_3$. Preference is given to γ-acryl- or γ-methacryloxypropyltri(alkoxy)silanes, α-methacryloxymethyltri(alkoxy)silanes, γ-methacryloxypropylmethyldi(alkoxy)silanes, vinylalkyldi-(alkoxy)silanes and vinyltri(alkoxy)silanes, examples of alkoxy groups which may be used being methoxy radicals, ethoxy radicals, methoxyethylene radicals, ethoxyethylene radicals, methoxypropylene glycol ether radicals, and ethoxypropylene glycol ether radicals. Examples of suitable silicon compounds c) are vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, 3-methacryloxypropyltrimethoxysilane, 3-methacryloxypropylmethyldimethoxysilane, methacryloxymethyltrimethoxysilane, 3-methacryloxypropyltris(2-methoxyethoxy)silane, vinyltrichlorosilane, vinylmethyldichlorosilane, vinyltris(2-methoxyethoxy)silane, trisacetoxyvinylsilane, and 3-(triethoxysilyl)propylsuccinic anhydride silane.

Other suitable compounds which may be added during the polymerization are functionalized, hydrolyzable silicon compounds selected from among the epoxysilanes and aminosilanes, such as glycidoxypropyltrimethoxysilane, glycidoxypropyltriethoxysilane, 3-(2-aminoethylamino) propyltrimethoxysilane, and 3-(2-aminoethylamino) propylmethyldimethoxysilane.

Other particularly suitable silane compounds c) are mercaptosilanes having chain-transfer ability and having the general formula $HS-(CR^4_2)_{1-3}-SiR^5_3$, where each $R^4$ is identical or different and is H or a $C_1$–$C_6$-alkyl group, each $R^5$ is identical or different and is a $C_1$–$C_6$-alkyl group or $C_1$–$C_6$-alkoxy group, where at least one of the radicals $R^5$ is an alkoxy group. Preference is given to 3-mercaptopropyltriethoxysilane, 3-mercaptopropyltrimethoxysilane, and 3-mercaptopropylmethyldimethoxysilane.

The most preferred silanes c) are vinyltrimethoxysilane, vinylmethyldimethoxysilane, vinyltriethoxysilane, vinylmethyldiethoxysilane, vinyltris(1-methoxy) isopropoxysilane, methacryloxypropyltris(2-methoxyethoxy)silane, 3-(triethoxysilyl)propylsuccinic anhydride silane, 3-mercaptopropyltrimethoxysilane, glycidoxypropyltrimethoxysilane, glycidoxypropyltriethoxysilane, 3-methacryloxypropyltrimethoxysilane, 3-methacryloxypropylmethyldimethoxysilane, and methacryloxymethyltrimethoxysilane, and mixtures of these, in particular mixtures of 3-methacryloxypropyltrimethoxysilane or methacryloxymethyltrimethoxysilane with vinyltrimethoxysilane, vinyltriethoxysilane, and/or 3-mercaptopropyltrimethoxysilane, and/or glycidoxypropyltriethoxysilane. The content of silanes c) is preferably from 0.05 to 3.5% by weight, particularly preferably from 0.1 to 1% by weight, most preferably from 0.1 to 0.6% by weight, based in each case on the total weight of the monomers a) to d) used.

Suitable comonomers d) containing epoxy groups are glycidyl acrylate, glycidyl methacrylate, allyl glycidyl ether, vinyl glycidyl ether, vinylcyclohexene oxide, limonene oxide, myrcene oxide, caryophyllene oxide. Preference is given to glycidyl acrylate, glycidyl methacrylate, allyl glycidyl ether, and vinyl glycidyl ether. The content of epoxy compounds is from 0.05 to 5% by weight, preferably from 0.25 to 1.5% by weight, and most preferably from 0.4 to 1.2% by weight, based in each case on the total weight of the monomers used. Greatest preference is given to copolymers having a combination of from 0.1 to 1.0% by weight of comonomer c) with from 0.25 to 1.5% by weight of comonomer d), and in particular, combinations with from 0.1 to 0.6% by weight of comonomer c) and from 0.4 to 1.2% by weight of comonomer d).

The dispersions are prepared by means of free-radical polymerization in an aqueous medium, preferably by emulsion polymerization. The polymerization is usually carried out in the temperature range from 20 to 100° C., in particular from 45 to 80° C. The reaction may be initiated by commonly used free-radical generators, the amounts of these being preferably from 0.01 to 3.0% by weight based on the total weight of the monomers. Preferred initiators are inorganic peroxides, such as ammonium, sodium, or potassium peroxodisulfates or hydrogen peroxide, either alone or in combination with reducing agents such as sodium sulfite, sodium hydrogen sulfite, sodium formaldehydesulfoxylate, or ascorbic acid. It is also possible to use water-soluble organic peroxides such as tert-butyl hydroperoxide or cumyl hydroperoxide, usually in combination with reducing agents, or water-soluble azo compounds. Operations for copolymerizing gaseous monomers, such as ethylene and vinyl chloride, are carried out at superatmospheric pressure, generally from 5 to 100 $bar_{abs}$.

To stabilize the dispersion, use may be made of anionic or non-ionic emulsifiers, or protective colloids. Preference is given to the use of non-ionic or anionic emulsifiers, preferably a mixture of non-ionic and anionic emulsifiers. Preferred non-ionic emulsifiers are condensation products of ethylene oxide or propylene oxide with linear or branched alcohols having from 8 to 18 carbon atoms, with alkylphenols, or with linear or branched carboxylic acids having from 8 to 18 carbon atoms. Block copolymers of ethylene oxide and propylene oxide are also useful. Examples of suitable anionic emulsifiers are alkyl sulfates, alkylsulfonates, alkyl aryl sulfates, and sulfates or phosphates of condensation products of ethylene oxide with linear or branched alkyl alcohols or with alkylphenols and containing from 5 to 25 EO units. Other examples of suitable anionic emulsifiers are mono- and diesters of sulfosuccinic acid. The amount of emulsifier is from 0.5 to 10% by weight, based on the total weight of the monomers a) used.

Protective colloids may also be used, where appropriate. Examples of suitable protective colloids are polyvinyl alcohols having from 75 to 95 mol %, preferably from 84 to 92 mol % of vinyl alcohol units; poly-N-vinylamides such as polyvinylpyrrolidones; polysaccharides such as starches and celluloses and their carboxymethyl, methyl, hydroxyethyl, and hydroxypropyl derivatives; synthetic polymers such as poly(meth)acrylic acid and poly(meth)acrylamide. It is most preferable to use polyvinyl alcohols. The amount of protective colloids generally used is from 0.1 to 10% by weight, based on the total weight of the monomers a).

Where appropriate, the usual regulators, for example alcohols such as isopropanol, aldehydes such as acetaldehyde, chlorine-containing compounds, mercaptanes such as n-dodecyl mercaptan, tert-dodecyl mercaptan, and mercapto-propionic acid or its esters, may be used for molecular-weight control. To adjust the pH, pH-regulating compounds, such as sodium acetate or formic acid, may be used during preparation of the dispersion.

Whatever the polymerization process, the polymerization may be carried out with or without use of seed latices, with some or all of the constituents of the reaction mixture forming an initial charge, or with some of the constituents of the reaction mixture forming an initial charge and some being metered in subsequently, or using a feed process with no initial charge. All of the comonomers a), b), c), and d) may form an initial charge for preparing the dispersion (batch process), or a portion of the monomers may form an initial charge, the remainder forming a feed (semibatch process). It is preferable for all of the silicone content b) to form an initial charge together with a portion of the monomers a), preferably up to 30% by weight of the monomer content a), and to be emulsified thoroughly. The remaining monomer a) is then metered in. The juncture of addition of the silicone is important, since the degree of crosslinking, the particle size distribution, and the homogeneity of the emulsion polymer are decisively dependent thereon. The best results are achieved when all of the silicone content b) is used in the initial charge. In the case of copolymerization of gaseous monomers a), such as ethylene, the desired amount is introduced by establishing a certain pressure. The pressure at which the gaseous monomer is introduced may be set initially to a certain value and allowed fall during the polymerization, or the pressure may be kept constant during the entire polymerization. The latter embodiment is preferred.

It is preferable for all of the silane content c), mixed with a portion of the monomers a), to be metered in during the polymerization, and it is likewise preferable for all of the epoxide content d) to be metered in. It is particularly preferable for the epoxide content d) to be metered in toward the end of the polymerization at from 80 to 100% conversion. Another preferred embodiment provides the feed of a mixture of two or more different silanes c). For example, one or more silanes are first metered in continuously, and a further, different silane is metered in together with the epoxide content after the feed of the first silane(s) has ended. The emulsifiers and, where appropriate, protective colloids used to stabilize the dispersion may all be within the initial charge, or a portion may be an initial charge and the remainder fed during the polymerization. The surface-active substances here may be fed alone or in the form of a preemulsion with the comonomers.

After completion of the polymerization, postpolymerization to remove residual monomer may be carried out by known methods, for example by redox-catalyst-initiated post-polymerization. It is also possible for volatile residual monomers and other volatile non-aqueous constituents of the dispersion to be removed by means of distillation, preferably at subatmospheric pressure, and, where appropriate, with passage of inert entraining gases such as air, nitrogen, or steam, through or over the product.

The aqueous dispersions obtainable by the process of the invention have solids contents of from 40 to 70% by weight, preferably from 50 to 65% by weight. To prepare water-redispersible polymer powders, the aqueous dispersions are dried, for example by means of fluidized-bed drying, freeze drying, or spray drying, where appropriate after addition of protective colloids as spraying aid. The dispersions are preferably spray dried. This spray drying takes place in conventional spray drying systems, with atomization by means of single-, twin-, or multifluid nozzles, or using a rotating disk. The discharge temperature selected is generally in the range from 45 to 120° C., preferably from 60 to 90° C., depending on the system, Tg of the resin, and the desired degree of drying.

The total amount of spraying aid is generally from 3 to 30% by weight, based on the polymeric constituents of the dispersion. Suitable spraying aids are the abovementioned protective colloids. During spraying it has often proven useful for there to be up to 1.5% by weight content of antifoam, based on the base polymer. To improve blocking resistance, the resultant polymer may be provided with an antiblocking agent (anticaking agent), preferably at up to 30% by weight, based on the total weight of polymeric constituents. Examples of antiblocking agents are calcium carbonate, magnesium carbonate, talc, gypsum, silica, kaolins, and silicates.

The procedure of the invention gives access to copolymers which give coatings with high wet-abrasion resistance. Furthermore, by suitable selection of the monomers a) and b), a high level of hydrophobic properties can be achieved. The resultant emulsion polymers are weathering-resistant, water-repellent, very stable, particularly with respect to alkalis, and non-soiling, and moreover have good permeability to water vapor, and can therefore also be used successfully for outdoor applications, e.g. in the construction sector in paints and renders. The polymers of the invention are therefore suitable for universal use.

The functionalized copolymers in the form of aqueous dispersions or water-redispersible powders are suitable for use in adhesives and coating compositions, and for the strengthening of fibers or of other materials, for example in the textile sector. They are also suitable as modifiers or hydrophobicizers, as binders in adhesives or in coating compositions, as a protective coating, e.g. for metals, or as a release coating, e.g. for paper treatment. They are particularly suitable as a binder for paints, adhesives, or coating compositions used in the construction sector, for example in tile adhesives or adhesives for exterior heat insulation systems, and in particular for use in low-emission polymer emulsion paints or polymer dispersion renders, both indoors and outdoors. The formulations for emulsion paints and dispersion renders are known to the skilled worker and generally comprise from 5 to 50% by weight of the functionalized silicone-hydrophobicized copolymer, from 5 to 35% by weight of water, from 5 to 80% by weight of filler, from 5 to 30% by weight of pigments, and from 0.1 to 10% by weight of other additives, these data in % by weight giving a total of 100% by weight in the formulation.

Examples of fillers which may be used are carbonates such as calcium carbonate in the form of dolomite, calcite, or chalk, silicates such as magnesium silicate in the form of talc, or aluminum silicates, such as loam and clays; powdered quartz, quartz sand, finely divided silica, feldspar, baryte, and calcium sulfate. Fibrous fillers are also suitable. Use is often made industrially of mixtures of various fillers, for example mixtures of fillers of different particle size, or mixtures of carbonaceous and silicaceous fillers. In the latter cases, the terms "carbonate-rich" or "silicate-rich" are used if there is more than 50% by weight, in particular more than 75% by weight of carbonate and silicate, respectively, based on the entire content of filler. The fillers present in polymer renders generally have coarser particles than those in emulsion paints. The particle size here is often from 0.2 to 5.0 mm. In other respects, the additives present in polymer renders may be the same as those in emulsion paints.

Suitable pigments are the inorganic pigments titanium dioxide, zinc oxide, iron oxides, and carbon black, and the commonly used organic pigments. Examples of other additives are wetting agents in proportions which are generally from 0.1 to 0.5% by weight based on the total weight of the formulation. Examples of these are sodium polyphosphates, potassium polyphosphates, polyacrylic acids, and salts of these. Other additives which may be mentioned are thickeners, the amount generally used of these being from 0.01 to 2.0% by weight, based on the total weight of the formulation. Commonly used organic thickeners are cellulose ethers and starches. Bentonite is an example of an inorganic thickener. Other additives include preservatives, antifoams, antifreezes.

To prepare the adhesives or coating compositions, the polymer dispersion or polymer powder is mixed with the other constituents of the formulation, fillers and other additives, and homogenized in suitable mixers. The polymer powder may also be added in the form of an aqueous redispersion at the construction site. In many cases, a dry mixture is prepared, and the water required for use of the material is added directly prior to its use. When paste-like compositions are being prepared, the water content is often used first to form an initial charge, the dispersion is added, and finally the solids are incorporated by stirring.

In the case of use in a coating composition, a particular feature of the functionalized, silicone-hydrophobicized copolymers is that they guarantee high wet-abrasion resistances even at high pigment volume concentration (pvc), i.e. in highly filled and supercritically formulated compositions (pvc>65%). Pvc is generally ≧50%, preferably from 60 to 85%, and is calculated as pvc (%)=($V_{P+F}$×100)/($V_{P+F}$+$V_B$), where $V_{P+F}$=volume of pigment+filler and $V_B$=volume of binder. The functionalized copolymers are particularly suitable as binders in coating composition formulations for low-emission interior paints, in particular those with high pvc (highly filled paints), or as a hydrophobicizing binder for renders.

The examples below serve for further illustration of the invention, without in any way limiting the same.

EXAMPLES 1 to 12

In Examples 1 to 12, vinyl acetate-ethylene copolymer dispersions with an MFT of about 1° C. are prepared. The following are among the ingredients used:
Genapol X 150: ethoxylated isotridecyl alcohol, degree of ethoxylation: 15.
Mersolat: Na alkylsulfonate having from 12 to 14 carbon atoms in the alkyl radical.
Airvol 523: polyvinyl alcohol with Höppler viscosity of about 25 mPas (20° C., 4% by weight solution, measured by Höppler method) and a hydrolysis index of 140 (mg KOH/g of polymer) (degree of hydrolysis 88 mol %).
PDMS: polydimethylsiloxane with a chain length of about 100.
PDMS mixture: mixture of three polydimethylsiloxanes having about 100 SiOMe$_2$ units comprising 5% by weight of non-functionalized polydimethylsiloxane, 20% by weight of α-monovinyl-functionalized polydimethylsiloxane, and 75% by weight of α,ω-divinyl-functionalized polydimethylsiloxane.

EXAMPLE 1

73.35 kg of water, 26.92 kg of Airvol 523 (polyvinyl alcohol; 10% by weight solution), 4.76 kg of Genapol X 150 (40% by weight aqueous solution), 219.15 g of sodium acetate (100% purity), 3.41 kg of Mersolat (40% by weight aqueous solution), 1.91 kg of sodium vinylsulfonate (25% by weight), 23.82 kg of vinyl acetate, 4.76 kg of PDMS mixture, and 23.82 kg of VeoVa® 10 formed an initial charge in a 572 liter pressure autoclave. The pH was set to 5, using 10% by weight formic acid. 314 ml Trilon B (EDTA; 2% by weight aqueous solution) and 991 ml of ammonium iron sulfate (1% by weight solution) were also added. The vessel was heated to 70° C. and a pressure of 20 bar of ethylene was applied. As soon as the reactor had reached thermal equilibrium, a 10.0% by weight ammonium persulfate solution (APS solution) was run in at 1,023 g per hour, as was a 5.05% by weight sodium sulfite solution at 1,976 g per hour. 25 minutes later, feed of a mixture of 164.36 kg of vinyl acetate, 23.82 kg of VeoVa 10, and 1.22 kg of vinyltrimethoxysilane (Wacker Silan XL 10) was begun at a rate of 29.14 kg per hour (monomer feed).

At the same time, an emulsifier feed was introduced at a feed rate of 10.92 kg per hour. The emulsifier feed comprised 45.34 kg of water, 24.94 kg of Genapol X 150 (40% by weight aqueous solution), and 714.62 g of sodium acetate. The total feed time for the two feeds amounted to 6.5 hours. 15 min after the start of the reaction, the APS feed was reduced to 636 g per hour, and the Na sulfite feed to 1,226 g per hour.

30 minutes after the end of the vinyl acetate feed and emulsifier feed, the "GMA feed" was begun. The composition of "GMA feed" was 4.76 kg of water, 70.27 g of Genapol X 150, and 2.86 kg of glycidyl methacrylate. The feed time was 30 minutes (rate: 15.4 kg per hour). After the end of the "GMA feed", the APS and Na sulfite feed was continued for a further hour. After depressurization, the dispersion was treated with steam to minimize residual monomer ("stripped"), and then treated with Hydorol W preservative.

Dispersion Analyses

Solids content: 57.8%, pH: 5.31; Brookfield viscosity 20 (spindle 4): 1,920 mPas; MFT: 1° C.; glass transition temperature Tg: 5.4° C.; average particle size: 375.1 nm (nanosizer); density: 1.059 g/ml.

EXAMPLE 2

As in Example 1, except that the initial charge comprised 3.0 kg of PDMS mixture instead of 4.76 kg.

Dispersion Analyses

Solids content: 57.9%, pH: 5.15; Brookfield viscosity 20 (spindle 5): 2,240 mPas; MFT: 1° C.; glass transition temperature Tg: 5.1° C.; average particle size: 421.0 nm (nanosizer); density: 1.062 g/ml

EXAMPLE 3

As in Example 1 except that the initial charge comprised 1.21 kg of PDMS mixture instead of 4.76 kg.
Dispersion Analyses
Solids content: 58.5%, pH: 5.26; Brookfield viscosity 20 (spindle 4): 1,130 mPas; MFT: 1° C.; glass transition temperature Tg: 5.3° C.; average particle size: 363.3 nm (nanosizer); density: 1.065 g/ml

COMPARATIVE EXAMPLE 4

As in Example 1, except that the polymerization was carried out without silicone component b). Also unlike Example 1, the polyvinyl alcohol Airvol 523 (10% by weight solution) was moreover removed from the initial charge, and 26.92 kg were added to the emulsifier feed.
Dispersion Analyses
Solids content: 59.5%, pH: 5.04; Brookfield viscosity 20 (spindle 3): 2,160 mPas; MFT: 1° C.; glass transition temperature Tg: 5.0° C.; average particle size: 320.1 nm (nanosizer); density: 1.075 g/ml

EXAMPLE 5

As in Example 1 except that only 14.92 kg of VeoVa® 10 were present in the initial charge, instead of 23.82 kg, and only 14.92 kg of VeoVa® 10 were metered in, instead of 23.82 kg.
Dispersion Analyses
Solids content: 59.0%, pH: 5.12; Brookfield viscosity 20 (spindle 4): 1,660 mPas; MFT: 1° C.; glass transition temperature Tg: 6.4° C.; average particle size: 465.0 nm (nanosizer); density: 1.062 g/ml

EXAMPLE 6

As in Example 5, except that the initial charge comprised only 2.98 kg of silicone component b) instead of 4.77 kg.
Dispersion Analyses
Solids content: 59.2%, pH: 5.35; Brookfield viscosity 20 (spindle 5): 1,840 mPas; MFT: 1° C.; glass transition temperature Tg: 6.4° C.; average particle size: 419.4 nm (nanosizer); density: 1.067 g/ml

EXAMPLE 7

As in Example 5, except that the initial charge comprised 1.19 kg of silicone component b) instead of 4.77 kg.
Dispersion Analyses
Solids content: 59.0%, pH: 5.30; Brookfield viscosity 20 (spindle 4): 1,520 mPas; MFT: 1° C.; glass transition temperature Tg: 7.9° C.; average particle size: 424.2 nm (nanosizer); density: 1.072 g/ml

EXAMPLE 8

1.76 kg of water, 122.44 g of Genapol X 150 (40% by weight aqueous solution), 5.63 g of sodium acetate (100% purity), 113.53 g of Mersolat (40% by weight aqueous solution), 48.98 g of sodium vinylsulfonate (25% by weight), 581.60 g of vinyl acetate, and 30.61 g of PDMS mixture formed an initial charge in a 15.7 liter pressure autoclave. 9.7 ml of Trilon B (EDTA: 2% by weight aqueous solution) and 30.6 ml of ammonium iron sulfate (1% by weight solution) were also added. The vessel was heated to 70° C., and a pressure of 22 bar of ethylene was applied. As soon as the reactor had reached thermal equilibrium, a 5.4% by weight ammonium per sulfate solution (APS solution) was run in at 70 g per hour, and a 4.16% by weight sodium sulfite solution at 85 g per hour. 25 minutes later, a feed of a mixture of 5.51 kg of vinyl acetate and 31.24 g of vinyltrimethoxysilane (Wacker Silan XL 10) was begun at a rate of 852.4 g per hour (monomer feed).

At the same time, an emulsifier feed was run in at a feed rate of 537 g per hour. The emulsifier feed comprised 2.04 kg of water, 795.87 g of Airvol 523 (polyvinyl alcohol; 10% by weight solution), 633.64 g of Genapol X 150 (40% by weight aqueous solution), and 18.37 g of sodium acetate. The total feed time for the two feeds amounted to 6.5 hours.

15 min after the start of the reaction, the APS feed was reduced to 43.3 g per hour and the Na sulfite feed to 52.7 g per hour.

30 minutes after the end of the vinyl acetate and emulsifier feed, the "GMA feed" was begun. Composition of "GMA feed" was 122.44 g of water, 9.18 g of Genapol X 150 and 73.47 g of glycidyl methacrylate. Feed time was 30 minutes (rate: 411.0 g per hour). After the end of the "GMA feed", the APS and Na sulfite feed was continued for a further hour. After depressurization, the dispersion was treated with steam to minimize residual monomer ("stripped"), and then treated with Hydorol W preservative.
Dispersion Analyses
Solids content: 48.8%, pH: 5.17; Brookfield viscosity 20 (spindle 3): 500 mPas; MFT: 1° C.; glass transition temperature Tg: 4.8° C.; average particle size: 359.2 nm (nanosizer); density: 1.066 g/ml

COMPARATIVE EXAMPLE 9

As in Example 8, except that no silicone component b) was present in the initial charge instead of the 30.61 g used in Example 8.
Dispersion Analyses
Solids content: 49.6%, pH: 5.35; Brookfield viscosity 20 (spindle 3): 1,210 mPas; MFT: 1° C.; glass transition temperature Tg: 8.3° C.; average particle size: 378.3 nm (nanosizer); density: 1.074 g/ml

COMPARATIVE EXAMPLE 10

As in Example 1, except that no silane c) was used as compared to 1.22 kg of vinyltrimethoxysilane used in Example 1, and no epoxide d) was used as compared to 2.86 kg used in Example 1.
Dispersion Analyses
Solids content: 58.9%, pH: 5.27; Brookfield viscosity 20 (spindle 5): 2,420 mPas; MFT: 1° C.; glass transition temperature Tg: 5.9° C.; average particle size: 408.2 nm (nanosizer); density: 1.063 g/ml

COMPARATIVE EXAMPLE 11

As in Example 1, except that the initial charge comprised 4.76 kg of non-functionalized, and therefore non-polymerizable, polydimethylsiloxane (PDMS).
Dispersion Analyses
Solids content: 59.3%, pH: 5.36; Brookfield viscosity 20 (spindle 5): 2,180 mPas; MFT: 1° C.; glass transition temperature Tg: 4.9° C.; average particle size: 478.9 nm (nanosizer); density: 1.059 g/ml

EXAMPLE 12

As in Example 1, except that the initial charge comprised 4.76 kg of α,ω-divinylpolydimethylsiloxane with a chain length about 100 instead of 4.76 kg of PDMS mixture.
Dispersion Analyses
Solids content: 58.5%, pH: 5.19; Brookfield viscosity 20 (spindle 5): 2,150 mPas; MFT: 1° C.; glass transition temperature Tg: 5.9° C.; average particle size: 399.2 nm (nanosizer); density: 1.060 g/ml The dispersions were used to prepare paints with a silicate-rich formulation 1 (silicate/carbonate=180/43 parts by weight) and a carbonate-rich formulation 2 (carbonate/silicate=260/80 parts by weight) as given by the formulations set out below (Tables 1 and 2):

TABLE 1

| Paint formulation 1 (silicate-rich): | |
|---|---|
| water | 300 |
| cellulose ether (Tylose H 6000 YP) | 6 |
| dispersing agent (Dispex N 40) | 5 |
| dispersing agent (Calgon N) | 5 |
| sodium hydroxide (10% by weight) | 1 |
| preservative (Hydorol W) | 1 |
| antifoam (Agitan 260) | 4 |
| magnesium silicate (Talc N) | 30 |
| titanium dioxide pigment (Kronos 2300) | 250 |
| aluminum silicate, precipitated (P 820) | 50 |
| aluminum silicate (China clay B) | 100 |
| calcium carbonate, precipitated (Socal P2) | 13 |
| dolomite (Microdol 1) | 30 |
| polymer dispersion | 200 |
| antifoam (Agitan 260) | 5 |
| sum of parts by weight | 1000 |

TABLE 2

| Paint formulation 2 (carbonate-rich): | |
|---|---|
| water | 423 |
| cellulose ether (Tylose H6000YP) | 6 |
| dispersing agent (Dispex N 40) | 5 |
| dispersing agent (Calgon N) | 5 |
| sodium hydroxide (10% by weight) | 1 |
| preservative (Hydorol W) | 1 |
| antifoam (Agitan 260) | 4 |
| magnesium silicate (Talc N) | 80 |
| titanium dioxide pigment (Kronos 2300) | 100 |
| calcium carbonate (Omaycarb 2 GU) | 70 |
| calcium carbonate (Omyacarb 5 GU) | 70 |
| calcium carbonate, precipitated (Socal P2) | 70 |
| dolomite (Microdol 1) | 50 |
| polymer dispersion | 110 |
| antifoam (Agitan 260) | 5 |
| sum of parts by weight | 1000 |

The dispersions were also used to prepare renders as given by the formulation set out below (Table 3):

TABLE 3

| Render formulation 3 | |
|---|---|
| water | 91.2 |
| dispersing agent (Dispex N 40) | 2 |
| fungicide (Parmetol A23) | 2 |
| phyllosilicate thickener (Bentone EW, 5% by weight) | 15 |
| methylcellulose thickener (Tylose MH 10000 KG 4, 2% by weight) | 30 |
| acrylate thickener (Rohagit SD 15) | 1 |
| algicide (Algon P) | 1 |
| ammonia | 0.5 |
| cellulose fiber (Arbocel B400) | 3 |
| Dralon fiber (Dralon fiber 6.7/4 mm) | 2 |
| titanium dioxide (Kronos 2190) | 20 |
| kieselguhr (Celite 281) | 40 |
| chalk (Calcilit 100) | 360 |
| chalk (Calcilit 1.5–2 mm) | 320 |
| antifoam (Agitan 260) | 1 |

TABLE 3-continued

| Render formulation 3 | |
|---|---|
| polymer dispersion | 111.3 |
| Sum of parts by weight | 1000 |

Performance Tests a) Wet-Abrasion Resistance Test

Using the silicate-rich paint formulation 1 and the carbonate-rich paint formulation 2, wet-abrasion resistance was tested by the nonwoven method (ISO 11998). For this, the ablation of the coating was determined via the weight loss from the paint film after 28 days (28 d). The paint ablation in $\mu$m was then calculated from the density of the paint, the areas abraded, and the weight loss from the paint film.

b) Water Droplet Test to Test Hydrophobic Properties

A trowel was used to spread a render prepared to the above formulation 3 on 3 conventional, commercially available calcium silicate blocks (10×10×5 cm) at particle-size thickness (about 2 mm, giving a total of from about 30 to 40 g of render per block). After drying, a syringe was used after one day and again after 7 days to apply 1 ml of water in the form of a droplet onto the render. A stopwatch was used to measure the time (data in min) required for the droplet to drain away and thus disappear. The longer this time, the higher the level of hydrophobic properties and the water-resistance of the render or, respectively, the dispersion present therein. If the dispersion is hydrophilic, the time required for the droplet to disappear is at most 10 minutes, whereas if the dispersions are hydrophobic the droplet remains in position for some hours.

Table 4 summarizes the composition of the dispersions, the determination of wet-abrasion resistance for formulations 1 and 2, and the determination of hydrophobic properties using formulation 3.

Silicone designations are as follows: PMDS mixture, "D"; non-functionalized PMDS, "P", and $\alpha,\omega$-divinylpolydimethylsiloxane, "Y".

VeoVa: VeoVa® 10, vinyl ester of $\alpha$-branched $C_{10}$ monocarboxylic acid

VTS: vinyltrimethoxysilane

GMA: glycidyl methacrylate

WA ($\mu$m)/28 d; 1: Wet abrasion test using nonwoven method after 28 days of storage, using paint formulation 1

WA ($\mu$m)/28 d; 2: Wet abrasion test using nonwoven method after 28 days of storage, using paint formulation 2

H (min)/1 d (7 d): Water droplet test used to test hydrophobic properties, using render formulation 3 after one and seven days, respectively.

TABLE 4

| Example | VeoVa % by wt. | Silicone % by wt. | VTS % by wt. | GMA % by wt. | WA($\mu$m) 28 d; 1 | WA($\mu$m) 28 d; 2 | H(min) 1 d | H(min) 7 d |
|---|---|---|---|---|---|---|---|---|
| 1 | 20 | 2 D | 0.5 | 1.2 | 8.7 | 38 | 400 | 410 |
| 2 | 20 | 1.25 D | 0.5 | 1.2 | 8.5 | 32.8 | 350 | 360 |
| 3 | 20 | 0.5 D | 0.5 | 1.2 | 9.2 | 39.6 | 230 | 250 |
| C4 | 20 | — | 0.5 | 1.2 | 9.7 | 31.7 | 150 | 100 |
| 5 | 12.5 | 2 D | 0.5 | 1.2 | 7.8 | 42.2 | 280 | 350 |
| 6 | 12.5 | 1.25 D | 0.5 | 1.2 | 9.8 | 41.1 | 210 | 250 |
| 7 | 12.5 | 0.5 D | 0.5 | 1.2 | 11 | 39.3 | 100 | 120 |
| 8 | — | 0.5 D | 0.5 | 1.2 | 9.7 | 31.4 | 80 | 85 |
| C9 | — | — | 0.5 | 1.2 | 8.1 | 35.2 | 11 | 8 |
| C10 | 20 | 2 D | — | — | 33.1 | 148.1 | 420 | 430 |
| C11 | 20 | 2 P | 0.5 | 1.2 | 12.1 | 48.3 | 310 | 160 |
| 12 | 20 | 2 Y | 0.5 | 1.2 | 9.1 | 37.2 | 295 | 300 |

From Table 4, it may be seen that if the amount of VeoVa 10 (a), silane (c) and GMA (d) is constant, the level of hydrophobic properties falls continuously when the silicone content (b) is reduced (Examples 1 to 3 and Comparative example 4; Examples 5 to 7). However, in these cases there is no resultant effect on wet-abrasion resistance. A comparison of Example 3 or Example 7 with Example 8 (without VeoVa) shows that the level of hydrophobic properties can be increased markedly by using VeoVa10 with ethylene and vinyl acetate as comonomers. In addition, there is also a decisive increase in alkali resistance.

A comparison of Example 8 with comparison Example 9 shows that the level of hydrophobic properties is drastically impaired or reduced to zero if no silicone (b) is used. Comparison of Example 1 with Comparative Example 10 shows that wet-abrasion resistance is drastically impaired when comonomers (c) and (d) are absent. In the two formulations 1 and 2, ablation of the coating (after 28 days of storage) increases by a factor of about 3 if silane (c) and epoxide (d) are omitted. These comonomers are therefore essential constituents for ensuring good wet-abrasion resistance.

A comparison of Example 1 with Comparative Example 11 shows that the level of hydrophobic properties is impaired if use is made of only a non-functionalized silicone (PMDS) which cannot copolymerize. A severe fall-off in the level of hydrophobic properties is moreover observed in particular after 7 days if no silicone has been included in the copolymerization. The time required for the water droplet to disappear has fallen to half for the test after 7 days in Example 11. In contrast to this, there is a slight increase in the level of hydrophobic properties in the test after 7 days when copolymerizable silicone is used. This is confirmed by Examples 1 to 3, 5 to 7, 8, and 10. For lasting hydrophobic properties it is therefore important that there are silicones present which have polymerizable groups, e.g. vinyl groups.

If use is made only of a bifunctional $\alpha,\omega$-functionalized silicone whose end groups are capable of polymerization, the resultant overall level of hydrophobic properties is poorer than when use is made of a mixture of non-functionalized, monofunctionalized, and bifunctionalized silicones. This is demonstrated by comparison of Example 1 with Example 12. However, in Example 12, unlike in comparative example 11, the level of hydrophobic properties remains constant over time, and this is seen in Example 12 in an unchanged value for the test after 7 days.

In summary it may therefore be said that the use of silicones improves hydrophobic properties. The additional use of ethylene and particularly VeoVa10 has a positive synergistic effect and leads to a further marked increase in the level of hydrophobic properties and (alkali) resistance. However, the proportion of silicone has a decisive influence on the level of hydrophobic properties. The hydrophobic properties achieved, particularly after a prolonged period, are unsatisfactory when non-polymerizable silicones are used, whereas the best results are obtained by using the silicone mixture.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A functionalized copolymer which has been hydrophobicized with silicones and is in the form of an aqueous dispersion or water-redispersible powder, comprising the polymerized product of
   a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics olefins, dienes, and vinyl halides,
   b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups,
   c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes,
   d) from 0.05 to 5.0% by weight of one or more monomers selected from the group consisting of ethylenically unsaturated epoxy compounds, wherein said %'s by weight are based on the total weight of the monomers and total 100%, wherein the copolymer comprises a vinyl acetate-ethylene copolymer or a copolymer of vinyl acetate and ethylene and at least one vinyl ester of an $\alpha$-branched carboxylic acid having 9 or 10 carbon atoms, each of these copolymers optionally further comprising one or more auxiliary monomers.

2. A functionalized copolymer which has been hydrophobicized with silicones and is in the form of an aqueous dispersion or water-redispersible powder, comprising the polymerized product of
   a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides, b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups, c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes, d) from 0.05 to 5.0% by weight of one or more monomers selected from the group consisting of ethylenically unsaturated epoxy compounds, wherein said %'s by weight are based on the total weight of the monomers and total 100%, wherein component b) comprises a binary mixture of mono functional and non-functional polydialkylsiloxanes, or bifunctional and non-functional polydialkylsiloxanes; or comprises a ternary mixture comprising non-functional polydialkylsiloxanes, monofunctional polydialkylsiloxanes, and bifunctional polydialkylsiloxanes.

3. A functionalized copolymer which has been hydrophobicized with silicones and is in the form of an aqueous dispersion or water-redispersible powder, comprising the polymerized product of a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides, b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups, c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes, d) from 0.05 to 5.0% by weight of one or more monomers selected from the group consisting of ethylenically unsaturated epoxy compounds, wherein said %'s by weight are based on the total weight of the monomers and total 100%, wherein the silicon compounds c) used comprise functionalized, hydrolyzable silicon compounds selected from the group consisting of epoxysilanes, aminosilanes, and mercaptosilanes of the general formula $HS-(CR^4_2)_{1-3}-SiR^5_3$, where $R^4$ is identical or different and are H or a $C_1-C_6$-alkyl group, and $R^5$ is identical or different and is a $C_1-C_6$-alkyl group or a $C_1-C_6$-alkoxy group, where at least one of the radicals $R^5$ is an alkoxy group.

4. A functionalized copolymer which has been hydrophobicized with silicones and is in the form of an aqueous dispersion or water-redispersible powder, comprising the polymerized product of;

a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides, b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups, c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes, d) from 0.05 to 5.0% by weight of one or more monomers selected from the group consisting of ethylenically unsaturated epoxy compounds, wherein said %'s by weight are based on the total weight of the monomers and total 100%, wherein said copolymer comprises from 0.1 to 1.0% by weight of comonomer c) with from 0.25 to 1.5% by weight of comonomer d).

5. A process for preparing a functionalized copolymer which has been hydrophobicized with silicones and is in the form of an aqueous dispersion or water-redispersible powder, comprising a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides, b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups, c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes, d) from 0.05 to 5.0% by weight of one or more monomers selected from the group consisting of ethylenically unsaturated epoxy compounds, wherein said %'s by weight are based on the total weight of the monomers and total 100%, by polymerizing monomers a) through d) by free-radical polymerization in an aqueous medium wherein all of the silane content c) is metered in during the polymerization, in admixture with a portion of the monomers a), and all of the epoxide content d) is metered in.

6. A process for preparing a functionalized copolymer which has been hydrophobicized with silicones and is in the form of an aqueous dispersion or water-redispersible powder, comprising a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides, b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups, c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes, d) from 0.05 to 5.0% by weight of one or more monomers selected from the group consisting of ethylenically unsaturated epoxy compounds, wherein said %'s by weight are based on the total weight of the monomers and total 100%, by polymerizing monomers a) through d) by free-radical polymerization in an aqueous medium, wherein the epoxide content d) is metered in toward the end of the polymerization, at from 80 to 100% conversion.

7. The process of claim 5, wherein one or more silanes are first metered in continuously and a further, different silane is metered in together with the epoxide content after the feed of the first silane(s) has ended.

8. The process of claim 5, wherein, after completion of the polymerization, post-polymerization is carried out to remove residual monomer, and optionally other volatile non-aqueous constituents of the dispersion are removed by means of distillation.

9. The process of claim 5, wherein the aqueous dispersions are dried, optionally after addition of protective colloids as spraying aid when drying is accomplished by spray drying.

10. A process for the strengthening of fibers or of particulate materials other than fibers, comprising contacting said fibers or particulate materials with a functionalized copolymer which has been hydrophobicized with silicones and is in the form of an aqueous dispersion or water-redispersible powder, comprising the polymerized product of
   a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides,
   b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups,
   c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes,
   d) from 0.05 to 5.0% by weight of one or more monomers selected from the group consisting of ethylenically unsaturated epoxy compounds, wherein said %'s by weight are based on the total weight of the monomers and total 100%.

11. A filler-containing coating or render formulation wherein said filler comprises greater than 50% based on the weight of the filler, of either silicate(s) or carbonate(s), and a binder comprising a functionalized copolymer which has been hydrophobicized with silicones and is in the form of an aqueous dispersion or water-redispersible powder, comprising the polymerized product of
   a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides,
   b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups,
   c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes,
   d) from 0.05 to 5.0% by weight of one or more monomers selected from the group consisting of ethylenically unsaturated epoxy compounds, wherein said %'s by weight are based on the total weight of the monomers and total 100%.

12. A low-emission polymer emulsion paint or polymer dispersion render which is a highly filled or supercritically formulated composition, containing a functionalized copolymer which has been hydrophobicized with silicones and is in the form of an aqueous dispersion or water-redispersible powder, comprising the polymerized product of
   a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides,
   b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups,
   c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes,
   d) from 0.05 to 5.0% by weight of one or more monomers selected from the group consisting of ethylenically unsaturated epoxy compounds, wherein said %'s by weight are based on the total weight of the monomers and total 100%.

13. A functionalized copolymer which has been hydrophobicized with silicones and is in the form of an aqueous dispersion or water-redispersible powder, comprising the polymerized product of
   a) from 60 to 98.89% by weight of one or more monomers selected from the group consisting of vinyl esters of optionally branched $C_{1-15}$ alkylcarboxylic acids, vinylaromatics, olefins, dienes, and vinyl halides,
   b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups,
   c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes,
   d) from 0.05 to 5.0% by weight of one or more monomers selected from the group consisting of ethylenically unsaturated epoxy compounds, wherein said %'s by weight are based on the total weight of the monomers and total 100%.

14. The functionalized, silicone-hydrophobicized copolymer of claim 13, wherein one or more polydimethylsiloxanes b) is/are selected from the group consisting of α,ω- divinylpolydimethylsiloxanes, α,ω-di(3-acryloxypropyl) polydimethylsiloxanes, α,ω-di(3-methacryloxypropyl) polydimethylsiloxanes, α-monovinylpolydimethylsiloxanes, α-mono(3-acryloxypropyl)polydimethylsiloxanes, α-mono(3-methacryloxypropyl)polydimethylsiloxanes, α-mono(3-mercaptopropyl)polydimethylsiloxanes, or α,ω-di(3-mercaptopropyl)polydimethylsiloxanes.

15. The functionalized, silicone-hydrophobicized copolymer of claim 13, wherein the silicon compounds c) used comprise ethylenically unsaturated, copolymerizable silicon compounds of the general formula $R^1SiR_{0-2}(OR^2)_{1-3}$, where R is a $C_1$–$C_3$-alkyl radical, $C_1$–$C_3$-alkoxy radical, or halogen, $R^1$ is $CH_2=CR^3-(CH_2)_{0-1}$ or $CH_2=CR^3CO_2(CH_2)_{1-3}$, $R^2$ is an optionally branched, optionally substituted alkyl radical having from 1 to 12 carbon atoms, or is an acyl radical having from 2 to 12 carbon atoms, and where $R^2$ may optionally be interrupted by an ether group, and $R^3$ is H or $CH_3$.

16. A functionalized copolymer which has been hydrophobicized with silicones and is in the form of an aqueous dispersion or water-redispersible powder, comprising
   a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides,
   b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups,
   c) from 0.05 to 5.0% by weight of one or more hydrolyzable silane monomers selected from the group consisting of ethylenically unsaturated hydrolyzable silicon compounds, and hydrolyzable silicon compounds selected from the group consisting of epoxysilanes, aminosilanes and mercaptosilanes,
   d) from 0.05 to 1.5% by weight of one or more monomers selected from the group consisting of ethylenically unsaturated epoxy compounds,
wherein said %'s by weight are based on the total weight of the monomers and total 100%.

17. A functionalized copolymer which has been hydrophobicized with silicones and is in the form of an aqueous dispersion or water-redispersible powder, comprising the polymerized product of
   a) from 60 to 98.89% by weight of one or more monomers selected from the group consisting of vinyl esters of optionally branched $C_{1-15}$ alkylcarboxylic acids, methacrylates and acrylates of $C_{1-15}$ alcohols, vinylaromatics, olefins, dienes, and vinyl halides,
   b) from 0.01 to 30% by weight of one or more silicones with from 10 to 1,000 $(C_nH_{2n+1})_2SiO$ repeat units where n is from 1 to 6, and where from 90 to 100% by weight of the silicones b) contain at least one but not more than two polymerizable groups,
   c) from 0.05 to 1.0% by weight of one or more hydrolyzable silane monomers selected from the group consisting of ethylenically unsaturated hydrolyzable silicon compounds, and hydrolyzable silicon compounds selected from the group consisting of epoxysilanes, amino silanes and mercaptosilanes,
   d) from 0.05 to 5.0% by weight of one or more monomers selected from the group consisting of ethylenically unsaturated epoxy compounds,
wherein said %'s by weight are based on the total weight of the monomers and total 100%.

* * * * *